Oct. 24, 1950     H. G. SMITH     2,526,832
APPARATUS FOR MEASURING THE PRESSURE-FLOW
CHARACTERISTICS OF GREASES
Filed Jan. 30, 1946
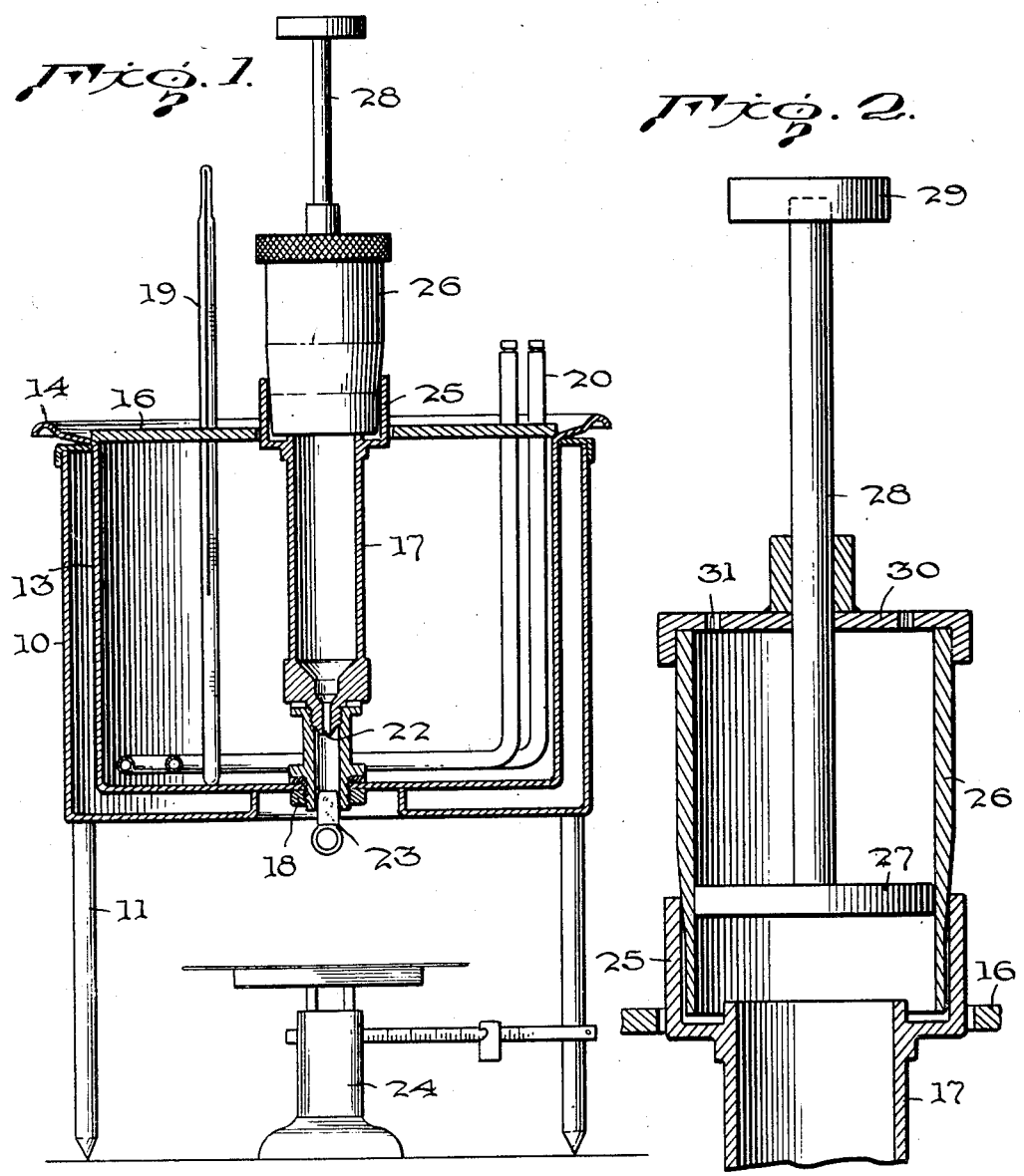
Inventor
HERSCHEL G. SMITH
By A. M. Houghton
his Attorney Patented Oct. 24, 1950

2,526,832

UNITED STATES PATENT OFFICE 2,526,832

APPARATUS FOR MEASURING THE PRESSURE-FLOW CHARACTERISTICS OF GREASES

Herschel G. Smith, Wallingford, Pa., assignor to Gulf Oil Corporation, Pittsburgh, Pa., a corporation of Pennsylvania Application January 30, 1946, Serial No. 644,369

4 Claims. (Cl. 73—64)

This invention relates to an apparatus for measuring the pressure-flow characteristics of greases such as lubricating greases as well as semi-fluid lubricating oils.

There are many known devices for measuring viscosity or flow characteristics of greases, such as lubricant greases, but many are not very accurate and other are complicated and cumbersome to operate. In the testing of lubricating oils there is an apparatus commonly used which is quite accurate and easy to operate. This device is known as the Saybolt-Furol viscosimeter and an adaptation of this instrument to the testing of greases is desirable because of economy, accuracy and ease of operation.

It is therefore an object of this invention to provide a new and improved apparatus for determining the pressure-flow characteristics of greases.

It is a further object of this invention to provide an apparatus for determining the pressure-flow characteristics of greases utilizing a Saybolt-Furol viscosimeter.

These and other objects of the present invention are attained by an apparatus, one embodiment of which is illustrated in the drawings, which comprises generally a fluid bath of controlled temperature surrounding a tube adapted to contain a grease sample having a nozzle of a fine bore at its lower end. Superimposed over the sample tube and detachable therefrom is a cylinder of larger diameter than the sample tube and adapted to contain an additional amount of the material to be tested. It is fitted with a piston having an upwardly extending piston rod. In operation a weight is placed on the top of the rod of the piston causing pressure on the whole sample of the material in both cylinder and tube and forcing the material through the nozzle. A balance placed under the nozzle catches the material as it falls through the nozzle, and from the time it takes a predetermined weight of the material to pass through the nozzle, pressure-flow characteristics may be determined.

This apparatus is intended to determine the pressure-flow characteristics of a grease through the orifice of a Saybolt-Furol viscosimeter under conditions of definite temperature and pressure control for which multiple test results can be determined with a single charge by means of a larger diameter reservoir tube. The pressure is supplied by a weight to the larger supply of grease in the cylinder which need not be subjected to temperature control. The pressure is in turn applied to the smaller volume of grease in the tube which is at a controlled temperature.

One form of the apparatus of this invention is illustrated in the accompanying drawings in which:

Fig. 1 is a side view partly in section of the entire apparatus and,

Fig. 2 is an enlarged sectional view of the upper pressure cylinder shown in Fig. 1.

With reference to Fig. 1 there is shown a jacket or casing 10 supported by tripod legs 11. Suspended within this jacket is a bath vessel 13 provided with a flange 14 at its upper edge adapted to hold it in position in jacket 10 so that there is an annular space between the jacket and the bath. The bath is further provided with a cover 16 having several apertures therein, the center one of which is adapted to receive sample tube 17 which is in turn rigidly secured through an aperture in the bottom of the bath and held in place as by a nut 18 and sealed by packing or other means. In the apparatus illustrated there is also provided a thermometer 19 and an electric heating coil 20 allowing for the control of the temperature of a fluid in the bath, such as water. Other heating means or even cooling means may be used and a stirring device, thermostat, or other apparatus may also be inserted in the bath.

Tube 17 is provided with a restricted orifice or nozzle 22 and a removable cork 23 at its lower end adapted to seal the tube against passage of the sample therethrough until the cork is removed. At the upper end of tube 17 is attached an overflow or gallery flange 25. When the device is used for oil testing, this gallery flange allows the sample tube to be completely filled with oil and any overflow caught in the flange. Inserted within the gallery flange is the lower end of pressure cylinder 26 which is shown in detail in Fig. 2. Below tube 17 should be located a balance 24 for weighing the sample passing through the tube. This may be any of the ordinary types of balance and need not be attached to the device.

With reference to Fig. 2 there is shown the upper portion of sample tube 17 to which is attached gallery flange 25 in which is inserted pressure cylinder 26. It will be noted that the outer wall of the pressure cylinder is beveled so that it is easily removable from the gallery flange and so that it is easily and effectively sealed when replaced in the gallery flange. The cylinder may be of any suitable material but is preferably machined brass. The cylinder is provided with a piston 27 operated by piston rod 28 and having thereon a cap 29 adapted to hold weights if desirable. The piston 27 should fit in cylinder 26 just tight enough to prevent substantial grease bypassing it but not to create undue friction. For this purpose a clearance of about 0.004 inch is suggested, and the inside diameter of the cylinder should be greater than the diameter of tube 17. The whole device is a precision instrument and should be so constructed. Cylinder 26 is provided with a head 30 adapted to guide piston rod 28 therethrough, and containing an air vent or vents 31 so that air pressure will not retard the downward movement of the piston. Head 30 is preferably fixed to the cylinder only by friction to permit easy removal in filling the cylinder. For reproducible results the piston rod and cap should be of uniform predetermined weight although any weight differential can be made up by placing weights on top of the cap.

One embodiment of the device adapted to fit a standard Saybolt-Furol viscosimeter comprised a brass or bronze cylinder having a 2⅛ inch diameter, a 1⅞ inch inside diameter and a height of 3 inches. The lower end of the outside of the cylinder was beveled to form a tight joint in the upper end of the Saybolt-Furol viscosimeter gallery flange. The piston rod was of monel metal of $\frac{5}{16}$ inch diameter and 5½ inches in length and this was attached to the piston by screw threads. The piston was a brass disc of ¼ inch thickness and of a diameter such that it allowed 0.004 inch clearance when fitted into the cylinder. The cap was a brass weight having a hole in the center thereof and only part way therethrough to receive the piston rod and hold it by frictional means.

In the operation of the device water or air is used in the bath and a predetermined temperature attained such as 77°±1° F. The tube 17 is filled with the grease sample taking care not to entrap large air bubbles and the temperature of the bath carefully maintained. Cylinder 26 is fitted into the gallery flange and this is filled nearly to the top with an additional amount of the grease sample. The cylinder head 30 and the piston rod and cap are then put in place and a predetermined weight put on top of the cap such as for example a 1000 g. weight. A sheet of paper is placed on the platform of the balance 24 and the weights set for the predetermined weight of sample, such as the weight in grams of 10 cc. of the sample being tested. A dish is then held under tube 17, the cork is removed and a few ccs. of the sample allowed to fall in the dish which is then quickly withdrawn allowing the sample to fall on the sheet of paper and at that instant the timer is started. When the balance shows that the desired weight of grease has passed through the tube, the timer is stopped. The dish may be inserted under the tube again while the sample on the paper is removed and a clean sheet of paper inserted and the process repeated. Other methods of operation will be apparent to those skilled in the art.

One method of determining flow characteristics of a grease sample is known as the Convis test and for this test at least five 10 cc. samples of the grease was timed and the average time taken disregarding any result which varies more than ±10% from the average of all determinations. The corrected average time in seconds is reported as the result of the Convis test.

Two special chassis lubricants were tested by this method with the following results:

|  | Lubricant A | Lubricant B |
|---|---|---|
| Convis Test: Sec.: |  |  |
| 77° F., 1200 Gram Weight |  | 1,430 |
| 5200 Gram Weight | 290 | 47 |
| 104° F., 2500 Gram Weight | 210 | 54 |

The apparatus is adapted to allow the use of the ordinary Saybolt-Furol viscosimeter, already in use in many laboratories, both as an oil viscosimeter and by the insertion of cylinder 26 as a grease viscosimeter.

The Saybolt viscosimeter is a standard instrument and while it may vary as to heating devices, etc. the tube is of a standard size. There are two orifice sizes and for testing greases the one known as the Saybolt-Furol viscosimeter is most suitable. This is described in A. S. T. M. Standard of Petroleum Products and Lubricants, dated October 1944, page 412.

While the device is adaptable to measuring the pressure-flow characteristics of a wide variety of materials, it is particularly suitable for the control of the consistency of soft greases such as automobile chassis lubricants for the pressure gun lubrication of automobile spring shackles and similar uses.

Thus I have described a new and useful apparatus for economy, accuracy and ease of operation in determining pressure-flow characteristics particularly of soft greases.

What I claim is:

1. An apparatus for measuring the pressure-flow characteristics of greases comprising in combination a Saybolt-Furol viscosimeter and a device adapted to easy removal and insertion into the gallery flange of said viscosimeter comprising a vertical cylinder having its outer surface near the lower end thereof tapered inwardly for a close fit within the gallery flange of said viscosimeter, a piston fitted within said cylinder, a piston rod attached at the upper side of said piston, a cylinder head adapted to guide said piston rod and a cap on the top of said piston rod adapted to hold weights.

2. An apparatus for measuring the pressure-flow characteristics of greases comprising in combination of Saybolt-Furol viscosimeter and a device adapted to easy removal and insertion into the gallery flange of said viscosimeter comprising a vertical cylinder having its outer surface near the lower end thereof tapered inwardly for a close fit within the gallery flange of said viscosimeter, and a piston fitted within said cylinder adapted to be operated by a weight.

3. An apparatus for measuring the pressure-flow characteristics of greases comprising a constant temperature bath, a tube adapted to contain a sample of grease arranged within said bath, a nozzle in the lower end of said tube, an overflow flange at the upper end of said tube, and a device adapted to easy removal and insertion into said overflow flange comprising a vertical cylinder of an inside diameter greater than the inside diameter of said tube and having its outer surface near the lower end thereof tapered inwardly for a close fit within said overflow flange, and a piston fitted within said cylinder adapted to be operated by a weight.

4. An apparatus for measuring the pressure-flow characteristics of greases comprising a constant temperature bath, a tube adapted to contain a sample of grease arranged within said bath, a nozzle in the lower end of said tube, an overflow flange at the upper end of said tube, and a device adapted to easy removal and insertion into said overflow flange comprising a vertical cylinder of an inside diameter greater than the inside diameter of said tube and having its outer surface near the lower end thereof tapered inwardly for a close fit within said overflow flange, a piston fitted within said cylinder, a piston rod attached at the upper side of said piston, a cylinder head adapted to guide said piston rod and a cap on the top of said piston rod adapted to hold weights.

HERSCHEL G. SMITH.

REFERENCES CITED

The following references are of record in the file of this patent:

UNITED STATES PATENTS

| Number | Name | Date |
|---|---|---|
| 829,287 | Parker | Aug. 21, 1906 |
| 1,535,871 | Stahley | Apr. 28, 1925 |
| 2,092,223 | Payne | Sept. 7, 1937 |

FOREIGN PATENTS

| Number | Country | Date |
|---|---|---|
| 577,578 | Germany | June 1, 1933 |